United States Patent
Li et al.

(10) Patent No.: US 11,980,186 B2
(45) Date of Patent: May 14, 2024

(54) PREPARATION METHOD OF EUCALYPTOL EMULSION AND APPLICATION THEREOF IN BIOPESTICIDES

(71) Applicant: Jiangnan University, Wuxi (CN)

(72) Inventors: Zhaofeng Li, Wuxi (CN); Caiming Li, Wuxi (CN); Zhengbiao Gu, Wuxi (CN); Haocun Kong, Wuxi (CN); Mingxia Quan, Wuxi (CN); Luxiao Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/155,264

(22) Filed: Jan. 17, 2023

(65) Prior Publication Data

US 2023/0172208 A1    Jun. 8, 2023

Related U.S. Application Data

(63) Continuation of application No. PCT/CN2022/082688, filed on Mar. 24, 2022.

(30) Foreign Application Priority Data

Mar. 26, 2021  (CN) .................... 202110344473.3

(51) Int. Cl.
*A01N 43/16*     (2006.01)
*A01N 25/04*     (2006.01)
*A01P 1/00*      (2006.01)

(52) U.S. Cl.
CPC ............. *A01N 43/16* (2013.01); *A01N 25/04* (2013.01); *A01P 1/00* (2021.08)

(58) Field of Classification Search
CPC ...... A61P 35/00; A61P 41/00; A61K 49/0032; A61K 49/0056; A01N 43/16; A01N 25/04; A01N 43/90; A01P 1/00; Y02A 50/30
USPC ....................................... 514/456
See application file for complete search history.

(56) References Cited

FOREIGN PATENT DOCUMENTS

| CN | 101669491 A | 3/2010 | |
|---|---|---|---|
| CN | 102626116 A * | 8/2012 | |
| CN | 102626116 A | 8/2012 | |
| CN | 104920492 A | 9/2015 | |
| CN | 105073085 A | 11/2015 | |
| CN | 105639120 A | 6/2016 | |
| CN | 108034499 A | 5/2018 | |
| CN | 108186736 A | 6/2018 | |
| CN | 108929781 A | 12/2018 | |
| CN | 109528649 A * | 3/2019 | ........... A61K 31/015 |
| CN | 109528649 A | 3/2019 | |
| CN | 109908779 A | 6/2019 | |
| CN | 110916163 A | 3/2020 | |
| CN | 107198666 B * | 8/2020 | ............. A61K 8/922 |
| CN | 111592934 A | 8/2020 | |
| CN | 113018457 A | 6/2021 | |
| CN | 113068705 A | 7/2021 | |
| DK | 137488 | 3/1988 | |
| EP | 0282951 A2 | 9/1988 | |
| JP | 2001029054 A | 2/2001 | |
| WO | 9503709 A1 | 2/1995 | |
| WO | 2020168421 A1 | 8/2020 | |
| WO | WO-2020168421 A1 * | 8/2020 | |

OTHER PUBLICATIONS

Nutho et al., Metadynamics supports molecular dynamics simulation-based binding affinities of eucalyptol and beta-cyclodextrin inclusion complexes, 2017, RCS Advances, vol. 7, pp. 50899-50911. (Year: 2017).*

Ciobanu et al., Retention of aroma compounds from Mentha piperita essential oil by cyclodextrins and crosslinked cyclodextrin polymers, Nov. 10, 2012, Food Chemistry, vol. 18, pp. 291-297. (Year: 2023).*

He, Yuan et. al. "Study on preparation of beta-cyclodextrin inclusion compound for eucalyptus oil" Lishizhen Medicine and Materia Medical Research 2005, vol. 17 No. 2 p. 169-170.

He, Yuan et. al. "Preparation and apprising of eucalyptus oil beta-cyclodextrin inclusion compound" China Pharmacy 2006 vol. 17 No. 4 p. 255-257.

* cited by examiner

*Primary Examiner* — Ali Soroush
(74) *Attorney, Agent, or Firm* — IPRO, PLLC

(57) ABSTRACT

The present disclosure provides a preparation method of eucalyptol emulsion and application thereof in biopesticides, belonging to the field of emulsion preparation. The method for preparing the eucalyptol emulsion includes the steps of: (1) adding eucalyptol into a cyclodextrin solution to obtain a mixed solution; (2) evenly mixing an emulsifier and a co-emulsifier to obtain a mixed solution; (3) adding the solution obtained in step (2) and water into the solution obtained in step (1), emulsifying to obtain the eucalyptol emulsion. In steps (1), (2) and (3), the mass percents of substances from which the eucalyptol emulsion is prepared are as follows: 0.5%-1% of cyclodextrin, 2.5%-25% of the eucalyptol, 1.25%-15% of the emulsifier, 0.3%-3.75% of the co-emulsifier and 55.3%-95.5% of the water, and the sum thereof is 100%. The emulsion is extremely stable without stratification after being placed at 20° C., 40° C. and 60° C. for 30 days and also has a good insecticidal effect.

11 Claims, 2 Drawing Sheets

000# PREPARATION METHOD OF EUCALYPTOL EMULSION AND APPLICATION THEREOF IN BIOPESTICIDES

TECHNICAL FIELD

The present disclosure relates to a preparation method of eucalyptol emulsion and application thereof in biopesticides, belonging to the field of emulsion preparation.

BACKGROUND

Eucalyptol, also known as 1,8-cineole, is a monoterpenoid compound. It mainly exists in the volatile oils of plants such as eucalyptus leaves, rosemary, and galangal. It has antibacterial, anti-inflammatory, insecticidal, analgesic and other effects. Therefore, it is widely used in medicine, daily chemicals, food and other industries. Eucalyptol can be used in combination with other drugs for the treatment of influenza, enteritis and various infections. It can also be used as a spice to prepare perfume, detergent, toothpaste and other products. In addition, the eucalyptol has a cool aroma and can be used as a food additive in chewing gum. In summary, the eucalyptol is rich in sources and has a wide range of uses, thus having high economic value and development prospects.

However, the eucalyptol is almost insoluble in water, volatile and poor in stability, which limits the application of the eucalyptol in industrial conditions such as light, heat and air. In addition, the hydrophobicity of the eucalyptol also limits its effectiveness in an aqueous environment. For example, as a biopesticide, the eucalyptol is not fully compatible with the internal environments of insects, and it is difficult for the eucalyptol to reach the target point, which weakens its effectiveness.

At present, there are relatively few reports on improving the defects of the eucalyptol. Zhou Hanjun published a method for nano-emulsification of eucalyptus oil (Zhou Hanjun. Study on extraction, nano-emulsification and antibacterial activity of eucalyptus oil [D]. Central South University of Forestry & Technology, 2016), but there are limitations in the range of emulsion preparation ratio, namely, an oil phase should not exceed 20% and a water phase should not be less than 60%.

SUMMARY

Technical Problems

Eucalyptol is almost insoluble in water, volatile and poor in stability. Therefore, the prepared aqueous solution has the problems of uneven dispersion and poor stability.

Technical Solutions

In order to solve at least one of the above-mentioned problems, the present disclosure uses an emulsifier combined with a co-emulsifier to prepare eucalyptol emulsion, which greatly improves the water solubility of the eucalyptol. Furthermore, cyclodextrin is used to encapsulate the eucalyptol, which has more advantages in improving the physical and chemical properties of the eucalyptol, preventing volatilization, enhancing solubility, reducing its sensitivity to the environment, and the like. In addition, since the simultaneous effect of the cyclodextrin and the emulsifier maintains the balance of a eucalyptol-water system, amounts of the cyclodextrin and the emulsifier can be reduced, which not only decreases the consumption of the cyclodextrin to reduce cost, but also makes up for the problem of insufficient water solubility of the cyclodextrin by introducing the emulsifier. Moreover, reducing the emulsifier addition is also effective for improving the safety of the system.

It is the first object of the present disclosure to provide a method for preparing eucalyptol emulsion, including the steps of:

(1) adding eucalyptol into a cyclodextrin solution, and evenly stirring to obtain a mixed solution;

(2) evenly mixing an emulsifier and a co-emulsifier to obtain a mixed solution of the emulsifier and the co-emulsifier;

(3) adding the mixed solution of the emulsifier and the co-emulsifier obtained in step (2) and water into the mixed solution obtained in step (1), and emulsifying to obtain the eucalyptol emulsion.

In one implementation of the present disclosure, the mass percents of substances from steps (1), (2) and (3) are as follows: 0.5%-1% of cyclodextrin, 2.5%-25% of the eucalyptol, 1.25%-15% of the emulsifier, 0.3%-3.75% of the co-emulsifier and 55.3%-95.5% of the water, and sum thereof is 100%.

In one implementation of the present disclosure, the evenly mixing described in step (1) refers to stirring at 40-60° C. for 5-15 min at a speed of 200-500 rpm, and more preferably, stirring at 50° C. for 10 min at a speed of 300 rpm.

In one implementation of the present disclosure, the cyclodextrin described in step (1) includes one or more of α-cyclodextrin, β-cyclodextrin and γ-cyclodextrin.

In one implementation of the present disclosure, the cyclodextrin solution described in step (1) has a mass concentration of 1%-2%.

In one implementation of the present disclosure, the cyclodextrin solution described in step (1) is prepared by adding the cyclodextrin to water, heating and stirring in a water bath at 40-60° C., and then mixing until the liquid is clear and transparent.

In one implementation of the present disclosure, the emulsifier described instep (2) includes one or more of polyoxyethylene castor oil, TWEEN® (polysorbate) and SPAN™ (sorbitan oleate).

In one implementation of the present disclosure, the co-emulsifier described instep (2) is anhydrous ethanol.

In one implementation of the present disclosure, the evenly mixing described in step (2) refers to mixing at 50° C. to achieve a state of transparency and good fluidity.

In one implementation of the present disclosure, the emulsifying described in step (3) refers to stirring at 40-60° C. for 15-25 min at a speed of 200-500 rpm, and more preferably, stirring at 50° C. for 20 min at a speed of 300 rpm.

The second object of the present disclosure is eucalyptol emulsion prepared by the method of the present disclosure.

The third object of the present disclosure is application of the eucalyptol emulsion according to the present disclosure in the fields of medicine, daily chemicals and agriculture, especially in biopesticides.

Beneficial Effects (1) According to the present disclosure, if the cyclodextrin and the emulsifier are used to prepare a eucalyptol emulsion, the raw materials are easily obtained and the process is simple, which is easy to realize industrial and large-scale production.

(2) According to the present disclosure, the cyclodextrin is introduced into the traditional emulsification technology and the eucalyptol is embedded by utilizing the "internal alienation and external affinity" property of the cyclodextrin to improve the stability of the eucalyptol, which provides a new method for enhancing the application performance of the eucalyptol.

(3) The emulsion prepared according to the present disclosure is extremely stable and does not stratify after being placed at 20° C., 40° C., and 60° C. for 30 days, which is beneficial to the storage, transportation and use of the product.

(4) The eucalyptol emulsion prepared according to the present disclosure has good dilution stability. Specifically, it can remain stable without stratification after being diluted in any proportion, thus obviously overcoming the defects of poor stability and insufficient water solubility of the eucalyptol.

(5) The eucalyptol emulsion product prepared according to the present disclosure has better insecticidal effect when being applied to the biopesticides.

DETAILED DESCRIPTION

Figure 1:
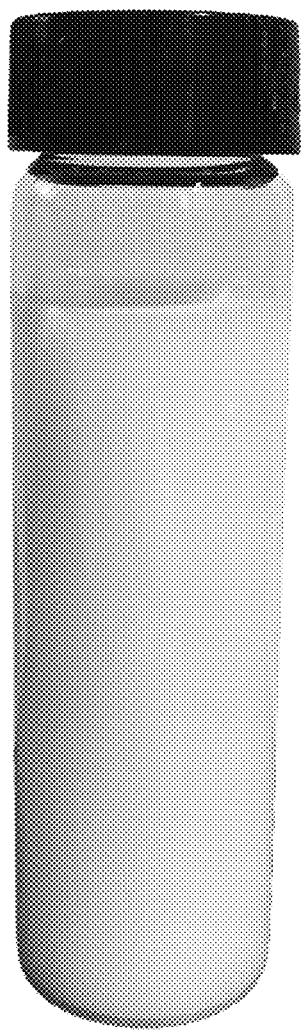
FIG. 1 is a view of a sample of eucalyptol emulsion in Example 1.

The preferred examples of the present disclosure are described below. It should be understood that the examples are intended to better explain the present disclosure and are not intended to limit the present disclosure.

Test Methods:

1. The Stability of Emulsion was Evaluated by a Direct Observation Method:

The emulsion was placed in a centrifugal tube and stood still at different temperatures (20° C., 40° C., and 60° C.). The state of the emulsion was observed regularly with the naked eyes and recorded whether it was uniform and stable.

2. Dilution Performance Evaluation of the Emulsion:

After gradient dilution of the emulsion, the direct observation method was carried out: part of liquid was drawn from the prepared system for two-fold gradient dilution, then stored in the centrifuge tube and placed at room temperature. The state of diluent was regularly observed with the naked eyes.

3. Determination of the Particle Size of the Emulsion:

A laser particle size analyzer was used to test the particle size of the optimized system. The particle size distribution was represented by a particle size span. The calculation formula (1) of the particle size span is as follows:

$$\text{Span} = (d_{90} - d_{10})/d_{50} \tag{1}$$

where $d_{90}$, $d_{50}$ and $d_{10}$ are the particle size values corresponding to 90%, 50% and 10% of the cumulative distribution of particle sizes, respectively.

4. Evaluation of Insecticidal Performance of Eucalyptol Emulsion Products:

With reference to the agricultural industry standards NYT 1154.6-2006 and NYT 1154.16-2013, the virulence of the optimized system to Bemisiatabaci and aphids was determined by adopting an insect-dip method and a leaf-dip method. Specifically, 7 treatment concentrations, namely, 500 mg/L, 250 mg/L, 125 mg/L, 62.5 mg/L, 31.25 mg/L, 15.63 mg/L and 7.81 mg/L were set for an aphid treatment group, and another 7 treatment concentrations, namely, 250 mg/L, 125 mg/L, 62.5 mg/L, 31.25 mg/L, 15.63 mg/L, 7.81 mg/L and 3.91 mg/L were set for a B. tabaci treatment group. A clear water control was also set and each treatment was repeated for 4 times with 20-40 insects each time. The specific operations were as follows:

Insect-dip method: the selected aphids together with their leaves were dipped in liquid medicine for 5s and then taken out; the liquid medicine was sucked up with absorbent paper; and the aphids were put into a pre-moisturized disposable plastic culture cup lined with filter paper. 30-40 aphids were placed in each cup. Treatment was repeated for 4 times at each concentration and 120-160 aphids were treated at each concentration. The control was treated with water. The culture cup was put into an incubator at $(26\pm2°)$ C. with a photoperiod of 16:8 (L:D). The results were checked after treatment for 48 h.

Agar moisturizing leaf-dip method: agar was prepared into 15-17 g/L with distilled water. 2 mL liquid agar was drawn with a micropipettor and added to the bottom of a flat-bottomed glass tube. Be careful not to contaminate the tube wall and produce air bubbles. Then, the liquid agar was cooled and solidified and steam on the tube wall was volatilized completely. The round leaves of with diameters of 18 mm in flowering cabbage leaves were separately dipped in liquid medicine of 7 series of concentrations for 5s. Next, leaves were taken out and dried at room temperature and the back sides thereof were adhered upward to the surface of the agar. The control was treated with distilled water. Adults of the B. tabaci subjected to eclosion for 24 h were inoculated and the tube was sealed with gauze. About 30 insects were treated each time and each treatment was repeated for 4 times. A finger-shaped tube inoculated with the insects was inverted and placed in an insectary for normal feeding. The feeding conditions were L/D=14:10, T=26±2° C., and RH=75±5%. The conditions of the test insects were checked after 1 h. The dead insects would not be included in the number of the test insects. Finally, the test results were checked after 48 h and the mortality rate was calculated.

The experimental results were statistically analyzed by SPSS. With mortality rate as the ordinate Y and the insecticide concentration as the abscissa X, a virulence regression equation of each insecticide was established and the $LC_{50}$ value and 95% confidence limit were calculated.

Example 1

A method for preparing eucalyptol emulsion included the following steps:

(1) 1.5 g of β-cyclodextrin was added into 98.5 g of distilled water, heated and stirred in a water bath at 40-60°

C., and then mixed until the liquid was clear and transparent to obtain a cyclodextrin solution with a concentration of 1.5%;

(2) 20 g of eucalyptol was added into the cyclodextrin solution obtained in step (1) and stirred at 50° C. for 10 min at a speed of 300 rpm to obtain a mixed solution;

(3) 10 g of an emulsifier (polyoxyethylene castor oil 30) and 2.5 g of a co-emulsifier (ethanol) were evenly stirred at 50° C. to form an emulsifier solution; and the emulsifier solution and 67.5 g of distilled water were added into the mixed solution obtained in step (2), and the mixture was stirred at 50° C. for 20 min at a speed of 300 rpm for emulsification to obtain the eucalyptol emulsion (FIG. 1).

The stability and dilution performance of the obtained eucalyptol emulsion were tested. The test results are as follows:

The eucalyptol emulsion prepared according to Example 1 is stable and even does not stratify after being stored at 20° C., 40° C., and 60° C. for 30 days. Hence, the eucalyptol emulsion has good stability and is beneficial to the storage, transportation and use of the product. Furthermore, the eucalyptol emulsion can remain stable after being diluted in any proportion, which shows that the eucalyptol emulsion well solves the problems of poor stability and water solubility of eucalyptol.

It can be seen from Table 1 that the emulsion of Example 1 has good insecticidal effect and biopesticide application performance. Specifically, $LC_{50}$, referring to a concentration of poison at which half of the pests under test die, can be used to evaluate the control effect of an insecticide on the pests well and objectively. The literature (Xie Ting, Jiang Ling, Hong Bo, et al. Virulence and Field Control Effect of Mixed BeauveriaBassiana and Matrineagainst B. tabaci [J]. ActaAgriculturaeBoreali-OccidentalisSinica, 2019, 28(05): 830-836) reported that the $LC_{50}$ of the matrine against the B. tabaci was 13.35 mg/L and that of the B. bassiana was 7.86 mg/L. It can be seen that the control effect of the emulsion in Example 1 on the B. tabaciis better than or basically the same as that of existing biopesticide products. The literature (Wang Zibang, Wei Shuqin. Indoor Virulence Determination and Field Control Effect of 3 Kinds of Botanical Pesticides on Blueberry Aphids [J]. South China Fruits, 2020, 49(06): 133-135+140) reported that the $LC_{50}$ of a 1.3% matrine aqueous solution against aphids was 19.01 mg/L and that of 0.3% azadirachtin emulsion was 11.20 mg/L and that of 6.0% rotenone micro emulsion was 34.75 mg/L. It can also be seen that the control effect of the emulsion in Example 1 on the aphids is better than or basically the same as that of existing biopesticide products.

TABLE 1

Evaluation results of insecticidal performance

| | Regression equation | $LC_{50}$ (mg/L) | Confidence interval | Correlation coefficient $R^2$ |
|---|---|---|---|---|
| B. tabaci | Y = 1.388X − 1.283 | 8.40 | 6.24-10.73 | 0.983 |
| Aphids (insect-dip method) | Y = 1.279X − 1.439 | 13.34 | 9.61-17.20 | 0.973 |

Figure 2:
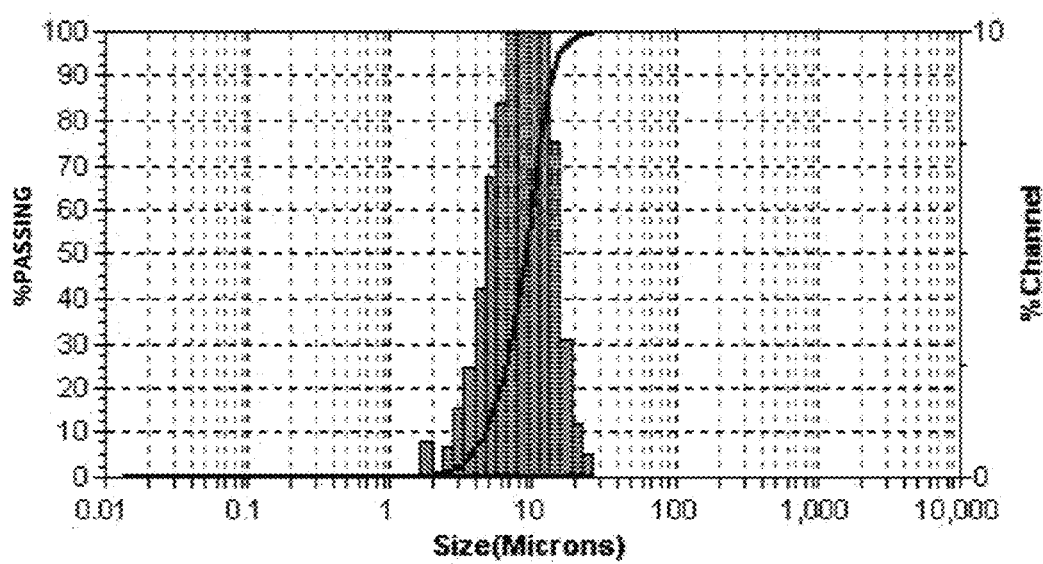
FIG. 2 is a particle size measurement diagram of the eucalyptol emulsion in Example 1.

The eucalyptol emulsion was subjected to particle size analysis. The results are shown in FIG. 2. It can be seen from FIG. 2 that the particle size span of the emulsion is 1.02, which is very close to 1, indicating that the particle size distribution in the emulsion is symmetrical. Besides, there is no phenomenon of too many large particles or small particles, so that it is easy for the emulsion to keep stable.

The insecticidal performance of the eucalyptol emulsion was evaluated; and the test results are shown in Table 1 below:

Example 2 Gradient Optimization of Eucalyptus Oil Application Amount

The eucalyptol amount in step (2) according to Example 1 was adjusted to 2 g, 5 g, 10 g, 30 g, 40 g, 50 g and 60 g; the water content in step (3) was adjusted accordingly to maintain the total system mass at 200 g; and others were maintained to be consistent with those in Example 1.

The stability and dilution performance of the obtained emulsion were evaluated; and the test results are as follows:

TABLE 2

Test results of Example 2

| Eucalyptol application amount (g) | Stability | | | Dilution performance |
|---|---|---|---|---|
| | 20° C. | 40° C. | 60° C. | |
| 20 (Example 1) | Uniform and stable | Uniform and stable | Uniform and stable | Diluted in any proportion |
| 2 | Stratified and unstable | Stratified and unstable | Stratified and unstable | All stratified |
| 5 | Uniform and stable | Uniform and stable | Uniform and stable | Diluted in any proportion |
| 10 | Uniform and stable | Uniform and stable | Uniform and stable | Diluted in any proportion |
| 30 | Uniform and stable | Uniform and stable | Uniform and stable | Diluted in any proportion |
| 40 | Uniform and stable | Uniform and stable | Uniform and stable | Diluted in any proportion |

TABLE 2-continued

Test results of Example 2

| Eucalyptol application amount (g) | Stability | | | Dilution performance |
|---|---|---|---|---|
| | 20° C. | 40° C. | 60° C. | |
| 50 | Uniform and stable | Uniform and stable | Uniform and stable | Diluted in any proportion |
| 60 | Uniform and stable | Stratified and unstable | Stratified and unstable | 1-10 times dilutable, other times stratified |

It can be seen from Table 2 that when the content of eucalyptol is too low (<2.5%), the prepared eucalyptol emulsion is unstable and stratified rapidly. It may be due to the low oil content in a two-phase system, which is not conducive to the balance of the oil-in-water system. When the content of the eucalyptol is within a range of 2.5%-25%, the prepared eucalyptol emulsion system is relatively stable. The emulsion can remain uniform and stable without stratification after being placed at 20° C., 40° C., and 60° C. for 30 days and can also maintain a good homogenization system after being diluted with water in any proportion. However, when the content of the eucalyptol is further increased, the newly prepared emulsion is uniform and stable and can maintain a stable state after being placed at 20° C. for 30 days. However, the emulsion is all stratified after being placed at 40° C. and 60° C. for 30 days, indicating that it is poor in thermal stability. Thus, the emulsion which contains more than 30% eucalyptol is not conducive to the storage and transportation. Furthermore, due to the high oil content, the emulsion can only be diluted by a factor of 1 to 10 when in use and further dilution will destroy its water-soluble properties and cause stratification.

Example 3 Gradient Optimization of Cyclodextrin Application Amount

The cyclodextrin amount in step (1) according to Example 1 was adjusted to 0 g, 0.5 g, 1 g, 2 g and 2.5 g; the water amount in step was adjusted to maintain the mass of a cyclodextrin solution at 100 g; and others were maintained to be consistent with those in Example 1.

The stability and dilution performance of the obtained emulsion were evaluated; and the test results are as follows:

TABLE 3

Test results of Example 3

| Cyclodextrin application amount (g) | Stability | | | Dilution performance |
|---|---|---|---|---|
| | 20° C. | 40° C. | 60° C. | |
| 1.5 (Example 1) | Uniform and stable | Uniform and stable | Uniform and stable | Diluted in any proportion |
| 0 | Stratified and unstable | Stratified and unstable | Stratified and unstable | All stratified |
| 0.5 | Stratified and unstable | Stratified and unstable | Stratified and unstable | All stratified |
| 1 | Uniform and stable | Uniform and stable | Uniform and stable | Diluted in any proportion |
| 2 | Uniform and stable | Uniform and stable | Uniform and stable | Diluted in any proportion |
| 2.5 | Precipitated and unstable | Precipitated and unstable | Precipitated and unstable | All precipitated |

It can be seen from Table 3 that when the content of cyclodextrin is too low (<0.5%), the prepared eucalyptol emulsion is unstable and stratified rapidly. It may be due to the low cyclodextrin content in a system, which is not conducive to the balance of the oil-in-water system. When the content of cyclodextrin is within a range of 0.5%-1%, the prepared eucalyptol emulsion system is relatively stable without stratification after being placed at 20° C., 40° C. and 60° C. for 30 days. The emulsion can also maintain a uniform system after being diluted with water in any proportion. However, when the content of the cyclodextrin is further increased (≥1.25%), the cyclodextrin inclusion is produced too much, exceeding its maximum solubility, and thus precipitates appear within one day after preparation.

Example 4 Gradient Optimization of Emulsifier Application Amount

The emulsifier amount in step (3) according to Example 1 was adjusted to 0 g, 0.5 g, 1 g, 2.5 g, 5 g, 20 g, 30 g and 40 g; the water content in step (3) was adjusted accordingly to maintain the total system mass at 200 g; and others were maintained to be consistent with those in Example 1.

The stability and dilution performance of the obtained emulsion were evaluated; and the test results are as follows:

TABLE 4

Test results of Example 4

| Emulsifier application amount (g) | Stability 20° C. | Stability 40° C. | Stability 60° C. | Dilution performance |
|---|---|---|---|---|
| 10 (Example 1) | Uniform and stable | Uniform and stable | Uniform and stable | Diluted in any proportion |
| 0 | Stratified and unstable | Stratified and unstable | Stratified and unstable | All stratified |
| 0.5 | Stratified and unstable | Stratified and unstable | Stratified and unstable | All stratified |
| 1 | Stratified and unstable | Stratified and unstable | Stratified and unstable | All stratified |
| 2.5 | Uniform and stable | Uniform and stable | Uniform and stable | Diluted in any proportion |
| 5 | Uniform and stable | Uniform and stable | Uniform and stable | Diluted in any proportion |
| 20 | Uniform and stable | Uniform and stable | Uniform and stable | Diluted in any proportion |
| 30 | Uniform and stable | Uniform and stable | Uniform and stable | Diluted in any proportion |
| 40 | Uniform, stable but viscous | Uniform, stable but viscous | Uniform, stable but viscous | Diluted in any proportion |

It can be seen from Table 4 that when only cyclodextrin is used for embedding without emulsifier, most of the eucalyptol is not embedded due to the high ratio of core material to wall material, resulting in instability and stratification of a system. Increasing the content of the cyclodextrin will enhance the cost of preparation and will produce lots of inclusion, exceeding its solubility and resulting in precipitation. When the emulsifier content is too low (<1.25%), the eucalyptol emulsion is unstable and stratified rapidly. The main reason may be that when the emulsifier content is too low, there is not enough emulsifier at the oil-water interface to reduce the surface tension and maintain the equilibrium between the two phases. When the emulsifier content is within a range of 1.25%-15%, the eucalyptol emulsion is relatively stable. The eucalyptol emulsion can remain stable without stratification after being stored at 20° C., 40° C., and 60° C. for 30 days or after being diluted with water in any proportion. However, when the emulsifier addition reaches 20%, the product has high viscosity and poor fluidity due to the high emulsifier content, which is not conducive to daily use and increases the preparation cost.

Example 5 Optimization of Emulsifier Types

The emulsifier types in step (3) according to Example 1 were adjusted as TWEEN® 80 (polysorbate 80, CAS No. 9005-65-6), a compound of TWEEN® 80 and SPAN' 60 (sorbitan monostearate, CAS No. 1338-41-6, in a mass ratio of 8:2), polyoxyethyleneoctyl phenol ether-10, sodium lauroyl sarcosine (LS-30N) or polyethylene glycol 40 (PEG-40) hydrogenated castor oil, which were commonly used to produce oil-in-water emulsion. Besides, other components were consistent with those in Example 1.

The stability and dilution performance of the obtained emulsion were evaluated; and the test results are as follows:

TABLE 5

Test results of Example 5

| Emulsifier | Stability 20° C. | Stability 40° C. | Stability 60° C. | Dilution performance |
|---|---|---|---|---|
| Polyoxyethylene castor oil 30 | Uniform and stable | Uniform and stable | Uniform and stable | Diluted in any proportion |
| TWEEN ® 80 | Uniform and stable | Uniform and stable | Uniform and stable | 1-10 times dilutable, other times stratified |
| Compound of TWEEN ® 80 and SPAN ™ 60 (8:2) | Uniform and stable | Uniform and stable | Uniform and stable | Diluted in any proportion |
| Polyoxyethyleneoctyl phenol ether-10 | Stratified and unstable | Stratified and unstable | Stratified and unstable | All stratified |
| Sodium lauroyl sarcosine (LS-30N) | Stratified and unstable | Stratified and unstable | Stratified and unstable | All stratified |
| PEG-40 hydrogenated castor oil | Stratified and unstable | Stratified and unstable | Stratified and unstable | All stratified |

It can be seen from the Table 5, when TWEEN® 80 and a mixture of the TWEEN® 80 and SPAN™ 60 are used as emulsifiers, the eucalyptol emulsion is relatively stable. The eucalyptol emulsion can remain stable without stratification after being placed at 20° C., 40° C., and 60° C. for 30 days. The eucalyptol emulsion prepared with a mixture of the TWEEN® 80 and SPAN™ 60 has better dilution performance than TWEEN® 80's, because the emulsifying property of TWEEN® 80 and SPAN™ 60 can be improved by the combination. Specifically, compounding emulsifiers with similar molecular structures can generally produce a good synergistic effect. TWEEN® and SPAN™ both have the structure of dehydrated sorbitol fatty acid ester. Furthermore, when high and low HLB emulsifiers are mixed, they can be adsorbed on an interface to form tightly packed "complexes", which increases the stability of the emulsion. By the way, the HLB value of the TWEEN® 80 is about 15 and the HLB value of the SPAN™ 60 is about 4.7. In conclusion, both are relatively suitable for compound emulsifier. However, since the SPAN™ 60 is solid powder which is difficult to uniformly disperse in the system, the complexity and time of operation will be increased when it is used. Therefore, SPAN™ 60 is not considered as the optimal solution. The emulsion with the TWEEN® 80 as the emulsifier can only be diluted at 1-10 times. Further dilution will destroy the water solubility of the emulsion and cause stratification, so that TWEEN® 80 is not considered an ideal emulsifier. When the polyoxyethyleneoctyl phenol ether-10, the sodium lauroyl sarcosine (LS-30N) and the PEG-40 hydrogenated castor oil are used as emulsifiers, the eucalyptol emulsion is unstable and stratified rapidly, which may be due to the incompatibility of these emulsifiers with the system or the preparation method.

Although the present disclosure has been provided as above in preferred embodiments, it is not intended to limit the present disclosure. Anyone familiar with this technology can make various changes and modifications without departing from the spirit and scope of the present disclosure. Therefore, the protection scope of the present disclosure should be defined by the Claims.

What is claimed is:

1. A method for preparing an eucalyptol emulsion by encapsulating eucalyptol in cyclodextrin, comprising the following steps, performed in the following order:
   (a) adding eucalyptol into a cyclodextrin solution, and evenly mixing to obtain a first mixed solution, thereby forming encapsulated eucalyptol;
   (b) evenly mixing an emulsifier and a co-emulsifier to obtain a second mixed solution of the emulsifier and the co-emulsifier;
   (c) adding the second mixed solution obtained in step (b) and water into the encapsulated eucalyptol in the first mixed solution obtained in step (a); and
   (d) emulsifying to obtain the eucalyptol emulsion,
   wherein:
   the eucalyptol emulsion produced by step (d) consists of, in mass percents of substances from steps (a), (b), and (c):
      0.5% to 1% cyclodextrin,
      2.5% to 25% eucalyptol,
      1.25% to 15% emulsifier,
      0.3% to 3.75% co-emulsifier,
      55.3% to 95.5% water, and
      a sum thereof is 100%;
   the cyclodextrin solution described in step (a) is an aqueous solution with a mass concentration of cyclodextrin of 1% to 2%;
   the emulsifier described instep (b) consists of one or more of polyoxyethylene castor oil 30, polyoxyethylene sorbitan monooleate, and sorbitan stearate; the co-emulsifier is ethanol, and
   wherein the eucalyptol emulsion prepared by the method is stable for at least thirty days at 20° C.

2. The method according to claim 1, wherein the evenly mixing described in step (a) refers to stirring at 40° C. to 60° C. for 5 min to 15 min at a speed of 200 rpm to 500 rpm.

3. The method according to claim 1, wherein the cyclodextrin described in step (a) comprises one or more of α-cyclodextrin, β-cyclodextrin, and γ-cyclodextrin.

4. The method according to claim 1, wherein the emulsifying described in step (d) refers to stirring at 40° C. to 60° C. for 15 min to 25 min at a speed of 200 rpm to 500 rpm.

5. An eucalyptol emulsion prepared by the method according to claim 1.

6. The method according to claim 1, wherein the emulsifier consists of a mixture of polyoxyethylene sorbitan monooleate and sorbitan stearate.

7. The method according to claim 1, wherein the eucalyptol emulsion is stable for at least thirty days at 40° C.

8. The method according to claim 5, wherein the eucalyptol emulsion is stable for at least thirty days at 60° C.

9. The method according to claim 1, wherein the cyclodextrin described in step (a) consists of α-cyclodextrin and/or γ-cyclodextrin.

10. The method according to claim 1, wherein the cyclodextrin described in step (a) consists of α-cyclodextrin and/or γ-cyclodextrin, wherein the emulsifier consists of polyoxyethylenesorbitan monooleate and sorbitan stearate, and wherein the eucalyptol emulsion is stable for at least thirty days at 60° C.

11. An eucalyptol emulsion prepared by the method according to claim 10.

\* \* \* \* \*